(12) United States Patent
Parrish

(10) Patent No.: US 11,045,840 B1
(45) Date of Patent: Jun. 29, 2021

(54) AUTOMATED ITEM SORTING FOR MULTI-ITEM ORDERS

(71) Applicant: Amazon Technologies, Inc., Seattle, WA (US)

(72) Inventor: Emily R. Parrish, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 160 days.

(21) Appl. No.: 16/382,410

(22) Filed: Apr. 12, 2019

(51) Int. Cl.
*B07C 3/06* (2006.01)
*B07C 3/00* (2006.01)
*G06Q 50/28* (2012.01)

(52) U.S. Cl.
CPC ............... *B07C 3/06* (2013.01); *B07C 3/008* (2013.01); *G06Q 50/28* (2013.01)

(58) Field of Classification Search
CPC .. B07C 3/06; B07C 3/008; B65G 1/04; B65G 1/0457; B65G 1/10; B65G 1/1373
See application file for complete search history.

(56) References Cited

U.S. PATENT DOCUMENTS

| | | | | |
|---|---|---|---|---|
| 3,596,782 A | * | 8/1971 | Morris, Sr. | B07C 3/06 198/367.1 |
| 9,008,830 B2 | * | 4/2015 | Worsley | G05D 1/0291 700/217 |
| 9,656,804 B2 | * | 5/2017 | Lyon | G06Q 30/0635 |
| 10,494,192 B2 | * | 12/2019 | DeWitt | B65G 43/08 |
| 2016/0327941 A1 | * | 11/2016 | Stiernagle | G05B 19/4155 |
| 2018/0290830 A1 | * | 10/2018 | Valinsky | B65G 1/0421 |

* cited by examiner

*Primary Examiner* — Patrick H Mackey
(74) *Attorney, Agent, or Firm* — Eversheds Sutherland (US) LLP

(57) ABSTRACT

Systems, methods, and computer-readable media are disclosed for automated item sorting for multi-item orders. In one embodiment, an example system may include a number of modular sorting machines coupled in series, the number of modular sorting machines comprising a first modular sorting machine, a first support coupled to the first modular sorting machine, a second support coupled to the first modular sorting machine, where the first support and the second support together form a first chute, and where the first support and the second support are configured to support a number of bins. The system may include a first bin of the number of bins disposed in the first chute at a first vertical position, and a second bin of the number of bins disposed in the first chute at a second vertical position, where the first bin and the second bin are configured to receive items for multi-item orders.

20 Claims, 10 Drawing Sheets

AUTOMATED ITEM SORTING FOR MULTI-ITEM ORDERS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
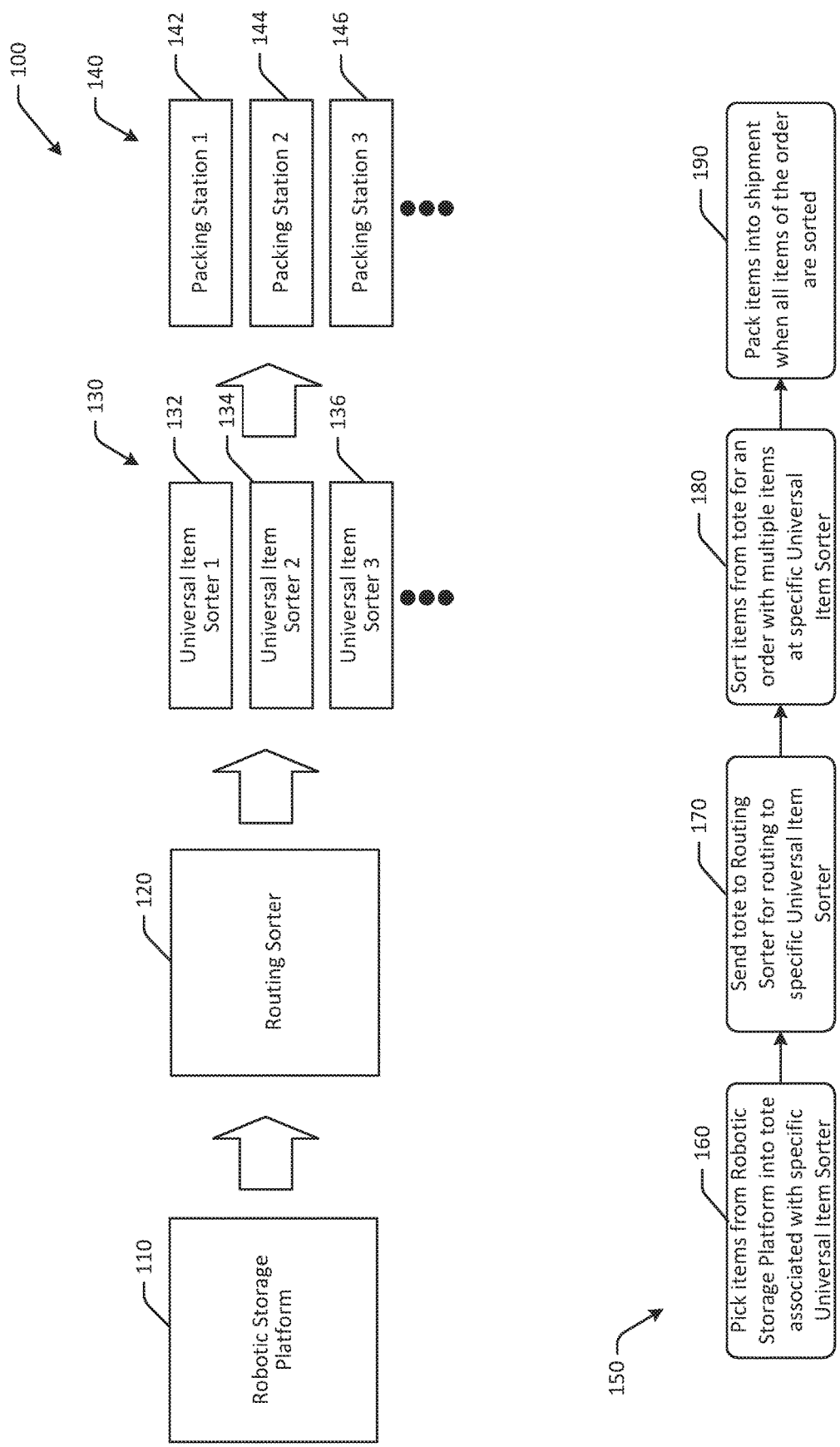
FIG. 1 is a hybrid schematic illustration of an example use case for automated item sorting for multi-item orders and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directed picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted.

Embodiments of the disclosure include methods and systems for automated item sorting that may improve processing and fulfillment of multi-item orders, or orders that include more than one item. Certain embodiments include item sorting systems with modular sorting machines that can be combined to form larger sorting machines, and that include receiving bins coupled to one or more sides (e.g., opposite sides, etc.) of the sorting machine to increase throughput and speed of consolidating items for multi-item orders. Some embodiments include optimized process flows for processing of orders at fulfillment centers, as well as process flows or methods to increase speed of consolidating products in a multi-item order. As a result, throughput of fulfillment centers may be improved, and/or logistics of fulfillment center operations may be less complicated.

Referring to FIG. 1, an example use case 100 for automated item sorting for multi-item orders and an example process flow in accordance with one or more embodiments of the disclosure. Although discussed in the context of online orders, other embodiments may be directed to any suitable use case where products are picked and sorted, such as instances where users may pick up orders rather than receiving a shipment.

In FIG. 1, a fulfillment center may include a robotic storage platform 110, a routing sorter 120, one or more universal item sorters 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular universal item sorter machine. For example, a certain tote may be associated with a certain universal item sorter, such that products that are designated to be picked and placed in the tote are for orders that are to be consolidated at that particular universal item sorter. The association between the tote and the universal item sorter may be static.

At the routing sorter 120, totes including products that have been picked may be routed to the appropriate or designated universal item sorter. For example, the routing sorter 120 may determine an identifier associated with the tote, and may determine the universal item sorter associated with the tote using the identifier. The routing sorter 120 may route or direct the tote to the appropriate universal item sorter.

The universal item sorters 130 may include one or more universal item sorter machines. In FIG. 1, a first universal item sorter 132, a second universal item sorter 134, a third universal item sorter 136, and so forth may be included. Any number of universal item sorters may be included. Some or all of the universal item sorters may be associated with certain totes. The universal item sorters may be used to consolidate or otherwise aggregate products for multi-item orders. For example, a first tote may include a first item of a multi-item order, and a second tote may include a second item of the multi-item order. The universal item sorter may therefore identify the orders associated with the respective products in a tote, and may transport the products to a container, such as a bin, associated with the order. When the order is complete with all of the products in the associated bin, the order may be packed. Accordingly, a specific universal item sorter may be designated for fulfillment of a particular multi-item order. As a result, all of the products in the multi-item order may be placed in totes that are associated with that particular universal item sorter. At the universal item sorters 130, totes that are received via the routing sorter 120 may be emptied, and the products in the respective totes may be transported to the appropriate bins for the orders for which the products were picked. Example universal item sorters are discussed with respect to at least FIGS. 3 and 5-8B.

After a multi-item order is complete (e.g., the universal item sorter has delivered all of the products in the order to the appropriate bin, etc.), the order may be packed at the packing station 140. In some embodiments, one or more packing stations may be included. In some instances, a packing station may service more than one universal item sorter, while in other instances, more than one packing station may service one universal item sorter. In the illustration of FIG. 1, a first packing station 142 may be used to pack orders from the first universal item sorter 132, a second packing station 144 may be used to pack orders from the second universal item sorter 134, a third packing station 146 may be used to pack orders from the third universal item sorter 136, and so forth. At the packing stations 140, the orders may be placed into boxes and sealed for subsequent shipment. The packages may then be processed for shipment to the user.

At the fulfillment center, an example process flow 150 illustrated in FIG. 1 may be implemented to improve the efficiency and/or throughput of the fulfillment center. At a first block 160, items may be picked from the robotic storage platform 110 into a tote that is associated with a specific universal item sorter. At a second block 170, the tote may be sent to the routing sorter 120 for routing to the specific universal item sorter. At a third block 180, the items from the tote may be sorted for an order with multiple item by the specific universal item sorter. At a fourth block 190, the items may be packed into a shipment when all of the items in the order are sorted.

Figure 2:
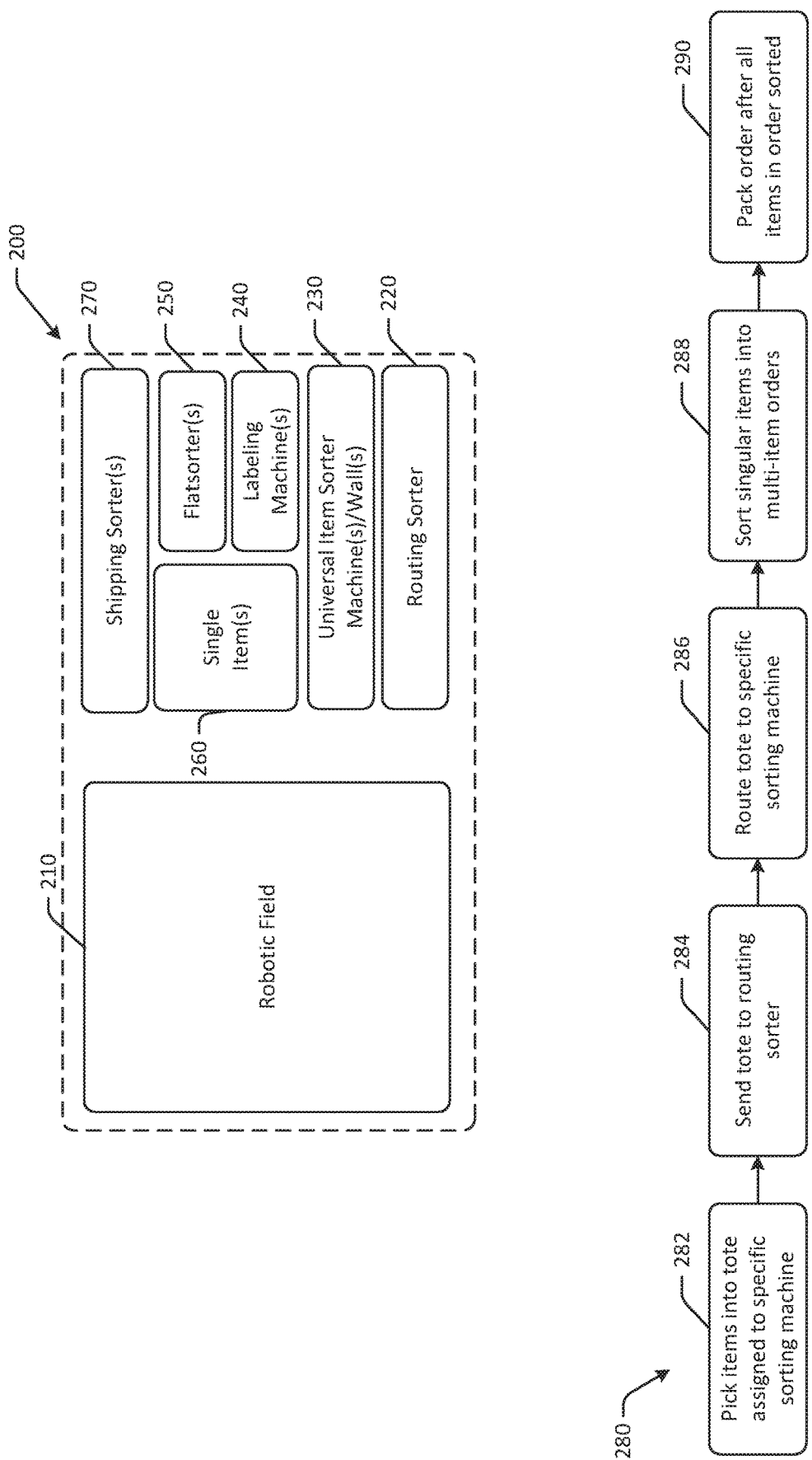
FIG. 2 is a hybrid schematic illustration of an example use case for automated item sorting for multi-item orders and an example process flow in accordance with one or more embodiments of the disclosure.

FIG. 2 is a hybrid schematic illustration of an example use case for automated item sorting for multi-item orders and an example process flow in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to consolidate products for multi-item orders, one or more universal item sorter machines/walls 230 that may be used to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200. In some embodiments, the flat sorters 250 and shipping sorters 270 may be combined into a single section.

The fulfillment center 200 may implement a process flow 280 for processing multi-item orders. At a first block 282, items for different orders may be picked into a tote that is assigned to a specific sorting machine, such as one of the universal item sorter machines 230. The tote may include items from any order that is being consolidated by the specific universal item sorter machine. The universal item sorter machine may sort singular items into multi-item orders. At a second block 284, the tote may be sent to a routing sorter. At a third block 286, the routing sorter may route or divert the tote to the assigned universal item sorter machine. At a fourth block 288, the universal item sorter machine may sort singular items into multi-item orders. At a fifth block 290, the order may be packed after all items in the order are sorted.

The universal item sorter machines 230 may include bins or containers of different sizes (e.g., small, medium, large, etc.) and may be configured, in one example, to handle items that weigh up to twenty or more pounds. In some embodiments, the universal item sorter machines 230 may include multiple chutes, such as about 328 chutes, and may be configured to sort items at a rate of about 2,100 units per hour. In some instances, the universal item sorter machines 230 may have two inductors (e.g., one on each side, etc.), and may be modular. For example, the universal item sorter machines 230 may each include sixteen expansion modules, where expansion modules may be defined as three two-sided columns next to one another for a total length of about 80 feet. The universal item sorter machines 230 may reduce labor and capital costs associated with processing orders.

In some embodiments, the universal item sorter machines 230 may replace other processes, such as manual processes. For example, manual induction of products from a tote to a sorter machine may be a bottleneck that is avoided by the systems and methods described herein. The universal item sorter machines 230 may be a cross-belt shuttle sorter that sorts singulated products into containers or totes. Universal item sorter machines 230 may be capable of sorting at a rate of 2,100 units per hour. Certain universal item sorter machines 230 may be configured to handle items of up to and including twenty pounds, or more in some instances, with dimensions of about 18"×14"×8", which may cover almost all products at the fulfillment center 200. The universal item sorter machines 230 may operate as a high-speed, high-destination sort solution that intakes items or packages and sorts them into containers using a shuttle that travels vertically and horizontally inside the machine (or outside in some instances).

Individual universal item sorter machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of bins (e.g. induct individual items from a bin that has multiple items, and place the inducted items into the appropriate bin, where bins are associated with multi-item orders. The tote from which items are inducted may be associated with the individual universal item sorter machine (e.g., the modular sorting machines that form the individual universal item sorter machine, etc.).

Accordingly, in some embodiments, universal item sorters may be arranged in rows and may receive assigned totes from a routing sorter, thereby streamlining fulfillment center operation and reducing labor and space costs. The universal item sorters may process totes for multi-order sortation and consolidation. As a result, there may no longer be a need to singulate and send items to a wall for manual extraction, because each tote may be assigned to a particular universal item sorter machine. Induct stations can be replaced with universal item sorter machines.

In another embodiment, pickers may pick items directly to a segmented belt conveyor at a station that is near a universal item sorter machine. Other nearby pick stations may also pick items directly to conveyance for the same universal item sorter machine. Picked items being transported to a single universal item sorter machine may merge together to be inducted into their unique universal item sorter machine, where multi-item orders may be consolidated and sent to packing.

Embodiments of the disclosure include automated item sorting for multi-item orders. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
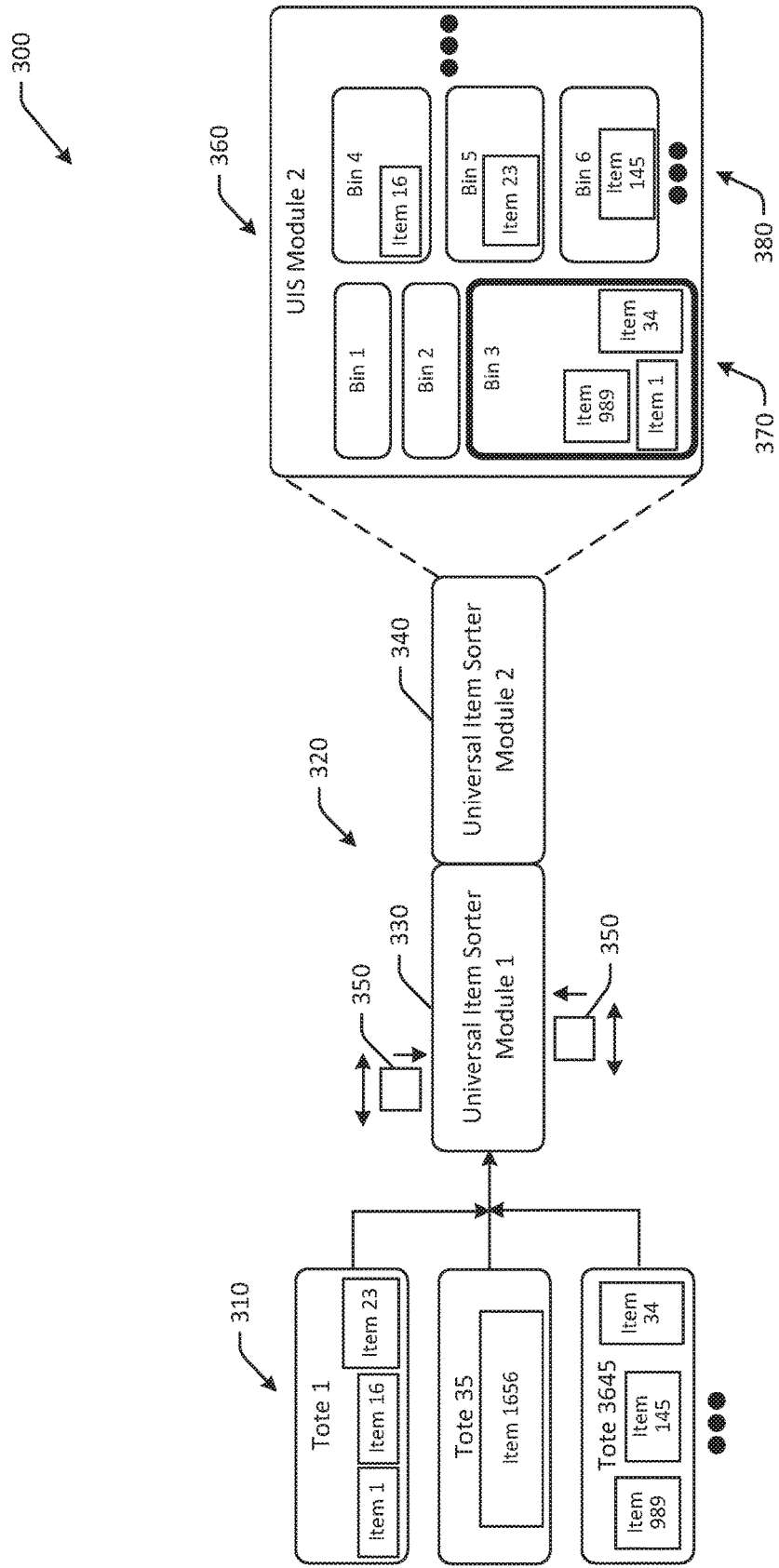
FIG. 3 is a schematic illustration of an item sorting system and additional components in accordance with one or more embodiments of the disclosure.

FIG. 3 is a schematic illustration of an item sorting system and additional components in accordance with one or more embodiments of the disclosure. Other embodiments may include additional or fewer components. The illustration of FIG. 3 is not to scale, and may not be illustrated to scale with respect to other figures. The universal item sorter illustrated in FIG. 3 may be the same universal item sorter discussed with respect to FIGS. 1-2.

In FIG. 3, an example use case 300 including a set of totes 310 and an item sorting system, or a universal item sorter machine 320, is depicted. The set of totes 310 may include one or more totes that are assigned to, or otherwise associated with, the universal item sorter machine 320. For example, Tote 1, Tote 35, Tote 3645, and so forth may be associated with the universal item sorter machine 320. The totes may have identifiers, such as alphanumeric or other identifiers. The totes may be used to place items that have been picked into the totes. The items that are placed in the totes may be associated with orders that are to be consolidated by the universal item sorter machine 320. For example, Tote 1 may include item 1, item 16, and item 23, Tote 35 may include item 1656, Tote 3645 may include item 989, item 145, and item 34, and so forth. The item sorting system, or the universal item sorter machine 320, may be configured to receive items from a tote that includes one or more, such as multiple items, and the tote may be assigned to the item sorting system or the universal item sorter machine 320.

The totes 310 may be directed to the universal item sorter machine 320 for sorting and consolidation. For example, items in the totes 310 may be inducted into the universal item sorter machine 320 via a conveyor belt.

The universal item sorter machine 320 may include one or more modules, and may be adjusted in size by adding or removing modules as needed. For example, the universal item sorter machine 320 may include a first modular item sorting machine 330 and a second modular item sorting machine 340. The second modular item sorting machine 340 may be coupled to the first modular item sorting machine 330.

The first modular item sorting machine 330 may include a first support disposed on a first side of the first modular item sorting machine 330, and a second support disposed on the first side of the first modular item sorting machine 330. The first support and the second support may form a first chute between the first support and the second support, as discussed with respect to FIGS. 5-8B. The first modular item sorting machine 330 may include a first bin positioned at a first vertical location in the first chute, and a second bin positioned at a second vertical location in the first chute. The first bin and the second bin may have the same height or different heights. In some embodiments, chutes may be disposed about more than one side of the first modular item sorting machine 330.

The second modular item sorting machine 340 may include a third support disposed on the first side of the second modular item sorting machine 340, and a fourth support disposed on the first side of the second modular item sorting machine 340. The third support and the fourth support may form a second chute, as discussed with respect to FIGS. 5-8B. The second modular item sorting machine 340 may include a third bin positioned at a first vertical location in the second chute, and a fourth bin positioned at a second vertical location in the second chute. The third bin and the fourth bin may have the same height or different heights, and may have different heights than the first bin and/or the second bin. The first bin, the second bin, the third bin, and/or the fourth bin can be rearranged in different vertical locations and chutes, and may be configured to receive items of orders comprising multiple items. In some embodiments, chutes may be disposed about more than one side of the second modular item sorting machine 340.

The respective modules of the universal item sorter machine 320 may include one or more bins, or containers that hold items of a multi-item order. For example, as illustrated in side view 360, the second modular item sorting machine 340 may include a first chute 370, or vertical stacking, of bins, and a second chute 380 of bins. The bins in the respective chutes may be of different sizes or dimensions, or may be placed in different vertical locations along the chute. The universal item sorter machine 320 may include a plurality of bins disposed in an array along one or more sides of the first modular item sorting machine 330 and the second modular item sorting machine 340. The respective bins may be configured to be repositioned within different chutes and/or at different vertical locations. In FIG. 3, Bin 1 and Bin 2 may have the same height, while Bin 3 in the same column or chute may have a different height. Any suitable number of bins may be included in a chute and/or array.

Items or products inducted from the totes 310 may be sorted and directed to a bin associated with the order for which the item was picked. The items may be transported by one or more shuttles 350, which may move in one or more directions within the universal item sorter machine 320. In some embodiments, the shuttles 350 may be positioned outside of the universal item sorter machine 320.

For example, Item 1 may be inducted from Tote 1 and placed in Bin 3, along with Item 989 and Item 34 from Tote 3645. Bin 3 may be associated with an order that included those three items, and may therefore be ready for packing. Similarly, Item 16 may be routed to Bin 4, Item 23 may be routed to Bin 5, Item 145 may be routed to Bin 6, and so forth. Any number of bins, totes, and/or modules may be included.

Figure 4:
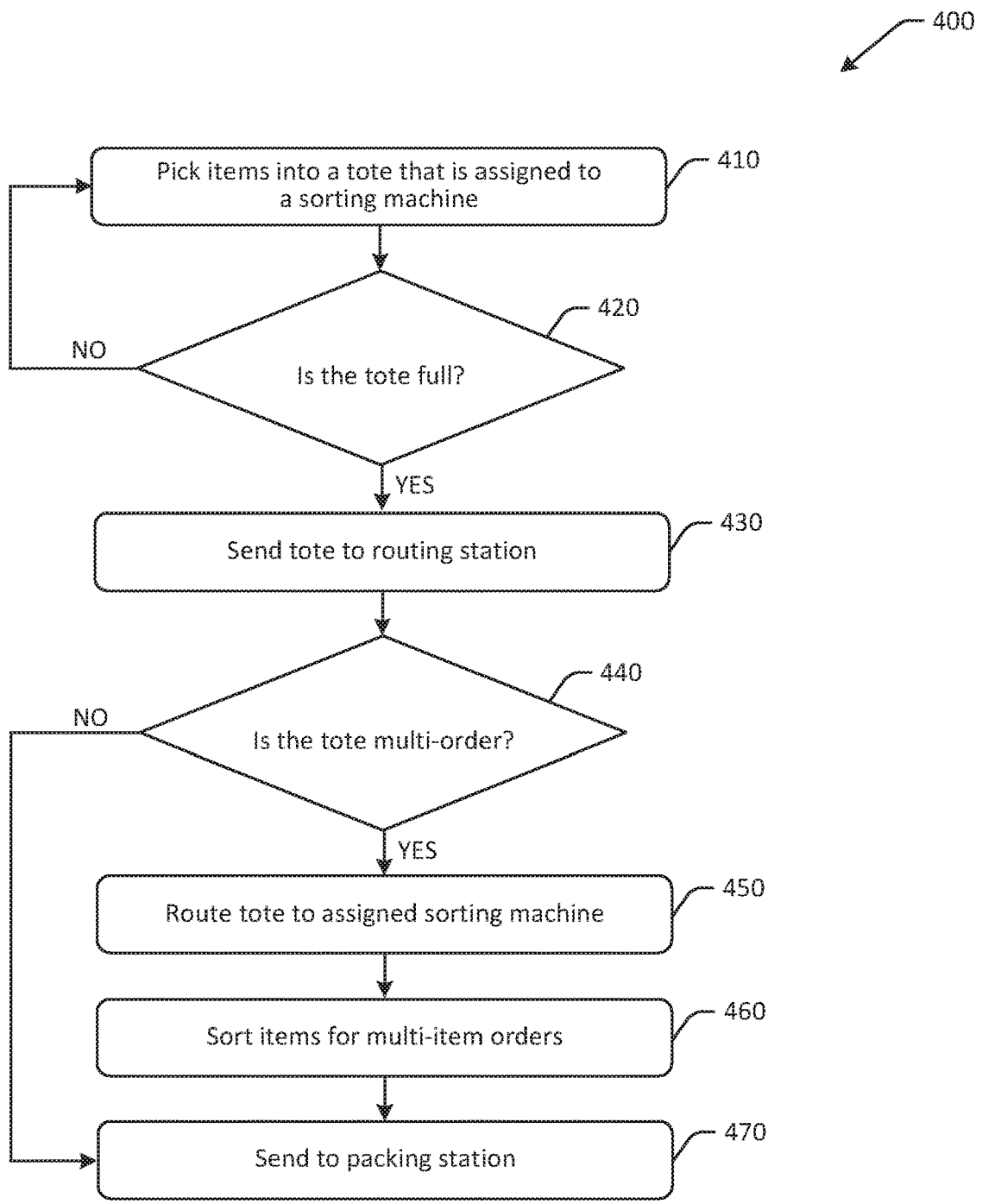
FIG. 4 is a schematic illustration of an example process flow for automated item sorting for multi-item orders in accordance with one or more embodiments of the disclosure.

FIG. 4 is a schematic illustration of an example process flow 400 for automated item sorting for multi-item orders in accordance with one or more embodiments of the disclosure. One or more of the blocks illustrated in FIG. 4 may be performed in a different order or across a distributed environment.

At block 410, items may be picked into a tote that is assigned to a sorting machine. The sorting machine may be a universal item sorter machine, such as that described with respect to FIGS. 1-3. Items placed in the tote may be for different orders. The orders may include multiple items.

At determination block 420, a determination may be made as to whether the tote is full. The determination may be made by a computer system that selects products for picking for a certain tote. If it is determined at determination block 420 that the tote is not full, the process flow may return to block 410. If it is determined at determination block 420 that the tote is full, the process flow may proceed to block 430. At block 430, the tote may be sent to a routing station.

At determination block 440, a determination may be made as to whether the tote is a multi-order tote, or a tote that include items from more than one order. The determination may be made by the same or a different computer system. If it is determined at determination block 440 that the tote is not a multi-order tote, the process flow may proceed to block 470 for packing and subsequent shipment. If it is determined at determination block 440 that the tote is a multi-order tote, the process flow may proceed to block 450.

At block 450, the tote may be routed to its assigned sorting machine. At block 460, the items from the tote may be sorted for multi-item orders. The sorting machine may sort the items from the tote into designated bins for multi-item orders. At block 470, the items may be sent to a packing station for packing and subsequent shipment.

Figure 5:
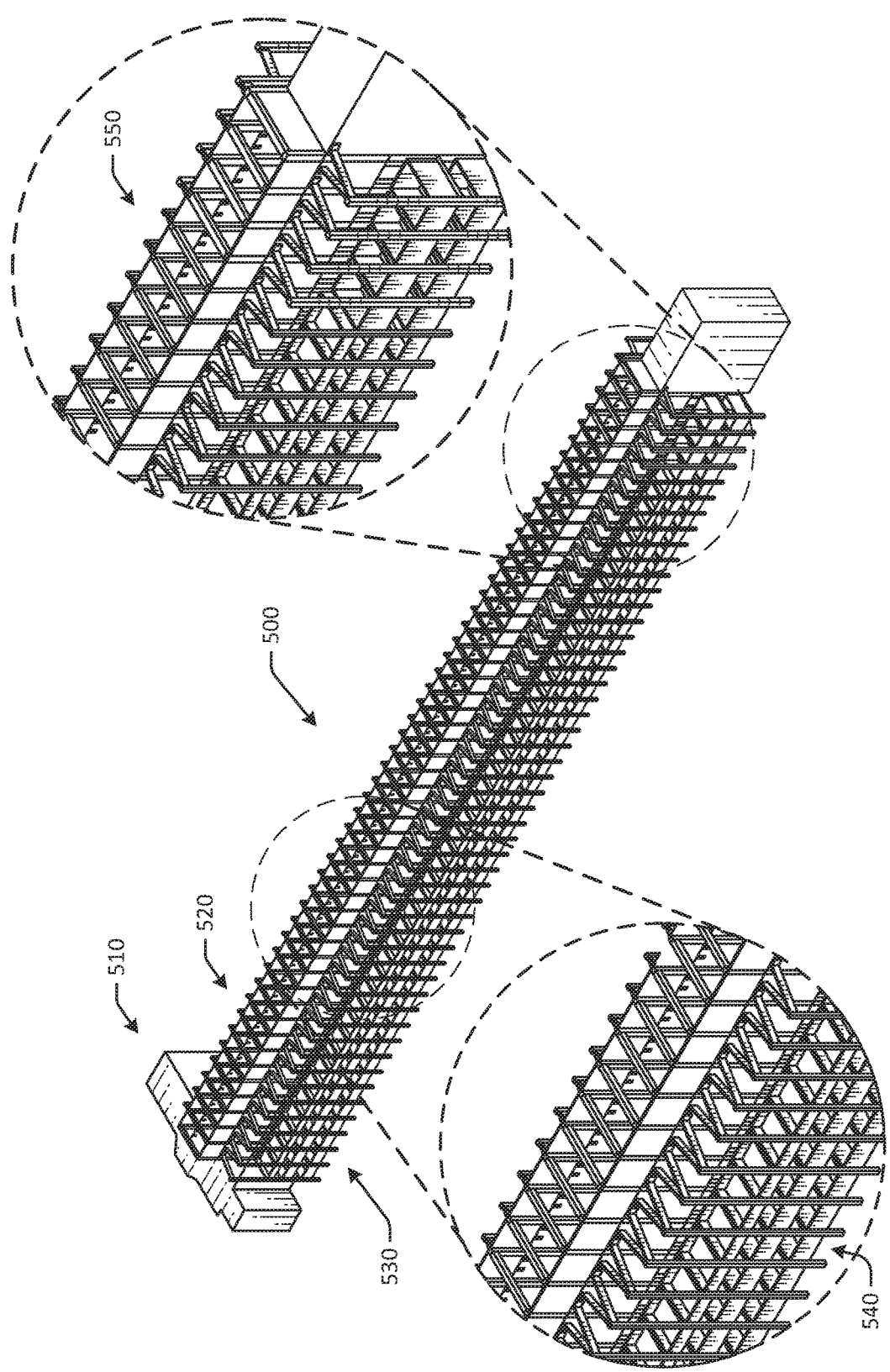
FIG. 5 is a schematic illustration of a perspective view and various detail views of an item sorting system in accordance with one or more embodiments of the disclosure.

FIG. 5 is a schematic illustration of a perspective view and various detail views of an item sorting system 500 in accordance with one or more embodiments of the disclosure. Other embodiments may include additional or fewer components. The illustration of FIG. 5 may not be to scale, and may not be illustrated to scale with respect to other figures. The item sorting system illustrated in FIG. 5 may be the same universal item sorter discussed with respect to FIGS. 1-4.

In FIG. 5, an item sorting system 500 may include an induction portion 510, where items may be inducted from totes that are assigned to the item sorting system 500. The item sorting system 500 may be a universal item sorter. The item sorting system 500 may include a first set of chutes 550 on a first side 520 of the item sorting system 500, and a second set of chutes 540 on a second side 530 of the item sorting system 500. The chutes may be vertical columns formed along the respective sides. One or more of the chutes may include one or more bins positioned at various vertical positions along the chute. The bins may be removable from the chute in some instances, and may not be removable in other instances. The bins may be of different sizes to accommodate different numbers of items and/or items of different sizes.

Figure 6:
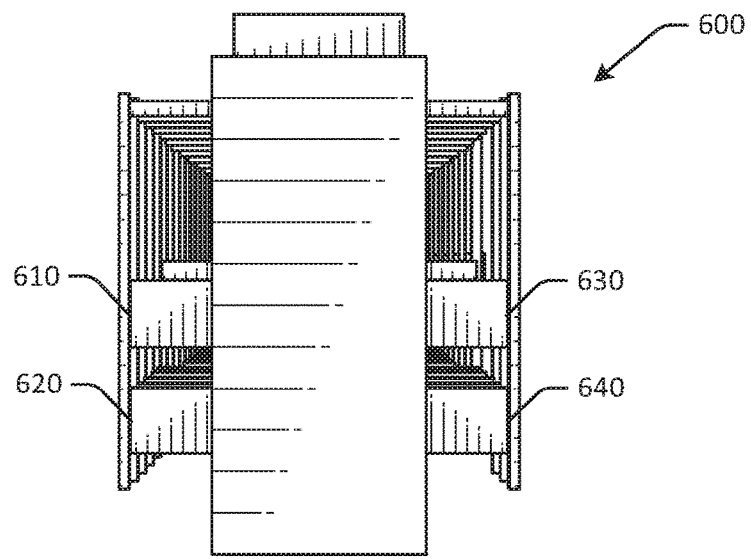
FIG. 6 is a schematic illustration of an end view and perspective view of an item sorting system in accordance with one or more embodiments of the disclosure.
Figure 6:
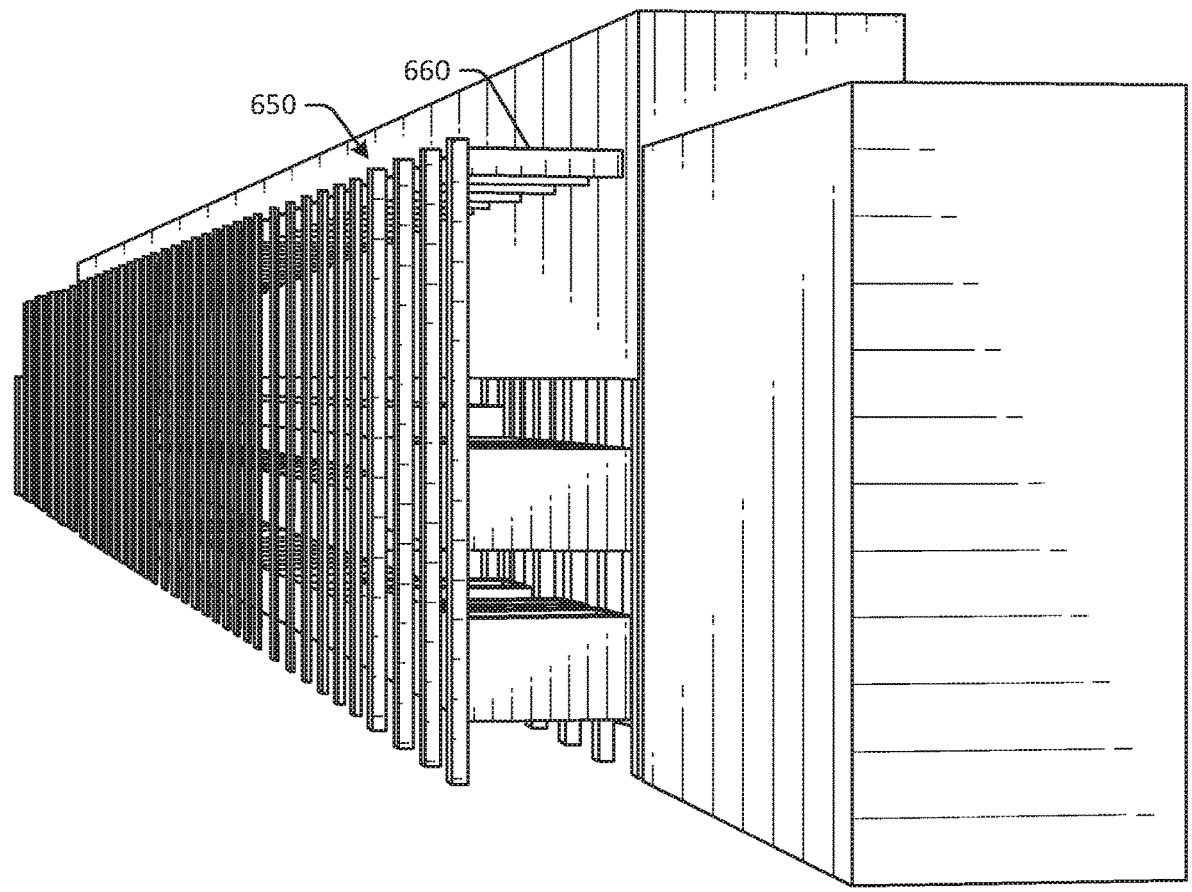

FIG. 6 is a schematic illustration of an end view and perspective view of an item sorting system in accordance with one or more embodiments of the disclosure. Other embodiments may include additional or fewer components. The illustration of FIG. 6 may not be to scale, and may not be illustrated to scale with respect to other figures. The item sorting system illustrated in FIG. 6 may be the same universal item sorter discussed with respect to FIGS. 1-5.

In FIG. 5, an end view of a universal item sorter 600 and a perspective view of the universal item sorter 600 is depicted. As illustrated in FIG. 6, the universal item sorter 600 may include a first bin 610 and a second bin 620 disposed in a first chute 660 on a first side 650 of the universal item sorter 600, and a third bin 630 and a fourth bin 640 disposed in a second chute on a second side of the universal item sorter 600. The bins may be of the same or different sizes. Any number of chutes and bins may be used. The bins may form an array along the first side 650 and/or other sides of the universal item sorter 600.

The universal item sorter 600 may include a plurality of modular sorting machines coupled in series. The universal item sorter 600 may be configured to singulate items from a tote that has a plurality of items into the plurality of bins.

Figure 7:
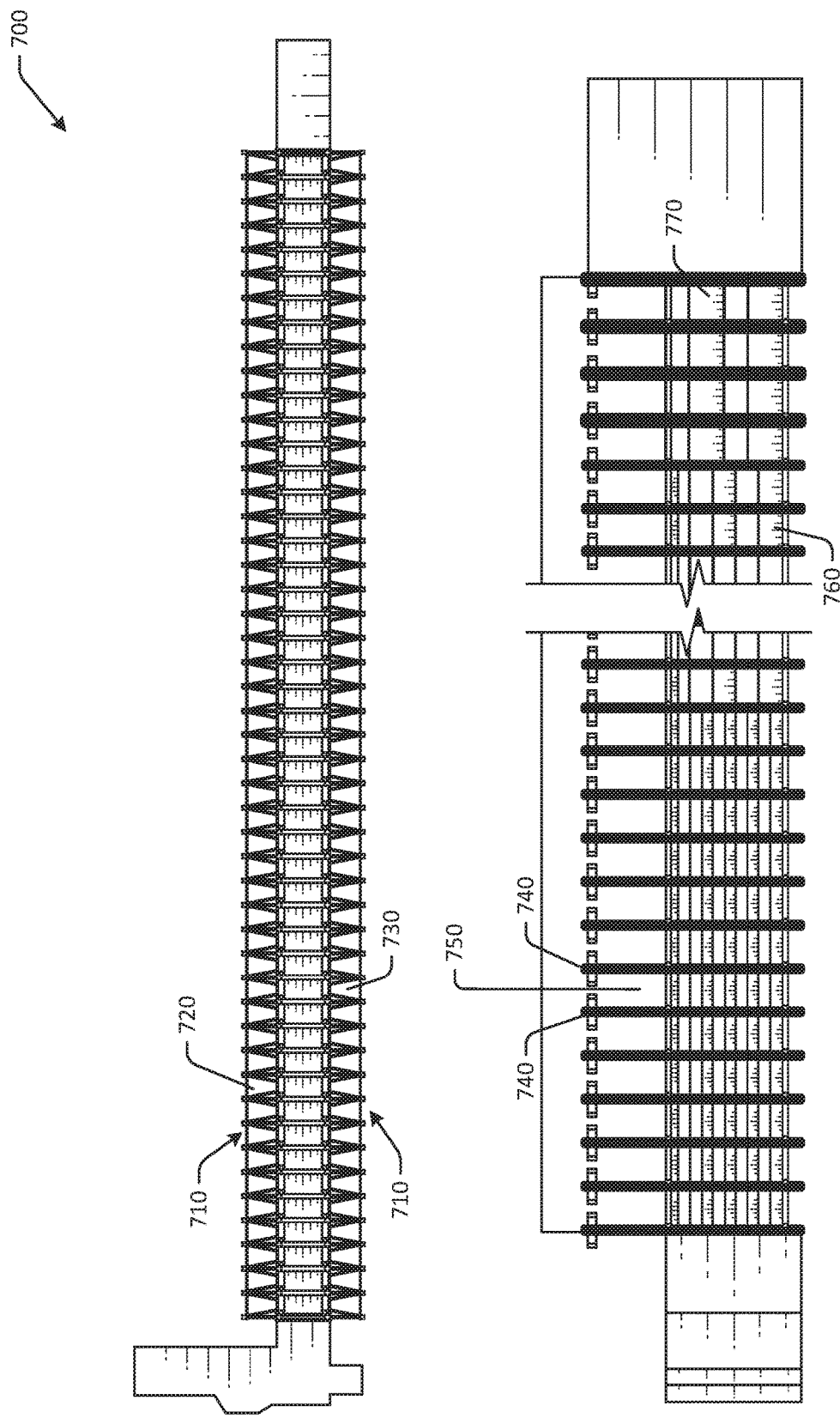
FIG. 7 is a schematic illustration of a top view and side view of an item sorting system in accordance with one or more embodiments of the disclosure.
Figure 8A:
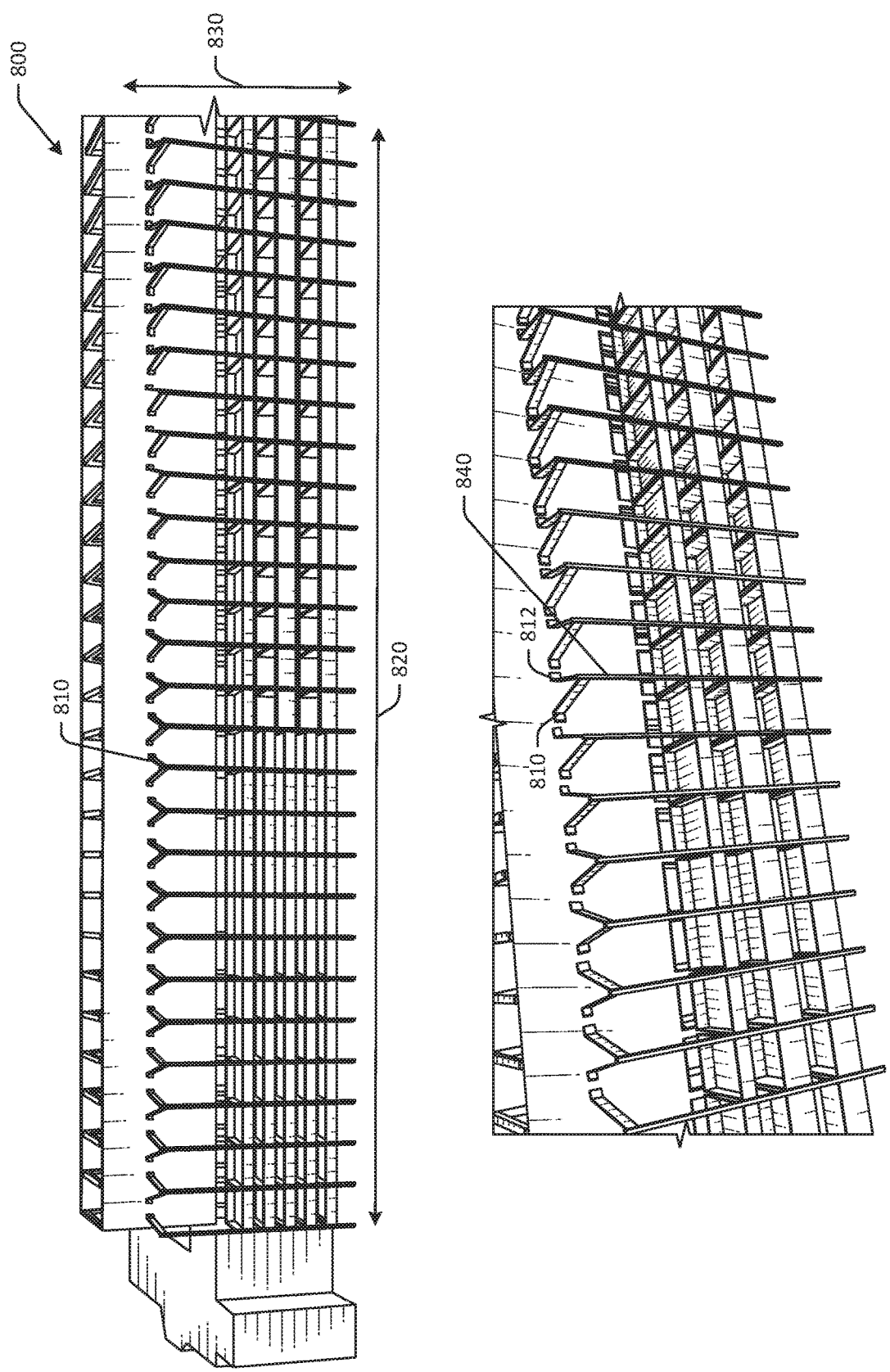
FIGS. 8A-8B are schematic illustrations of various views of an item sorting system with supports in accordance with one or more embodiments of the disclosure.
Figure 8B:
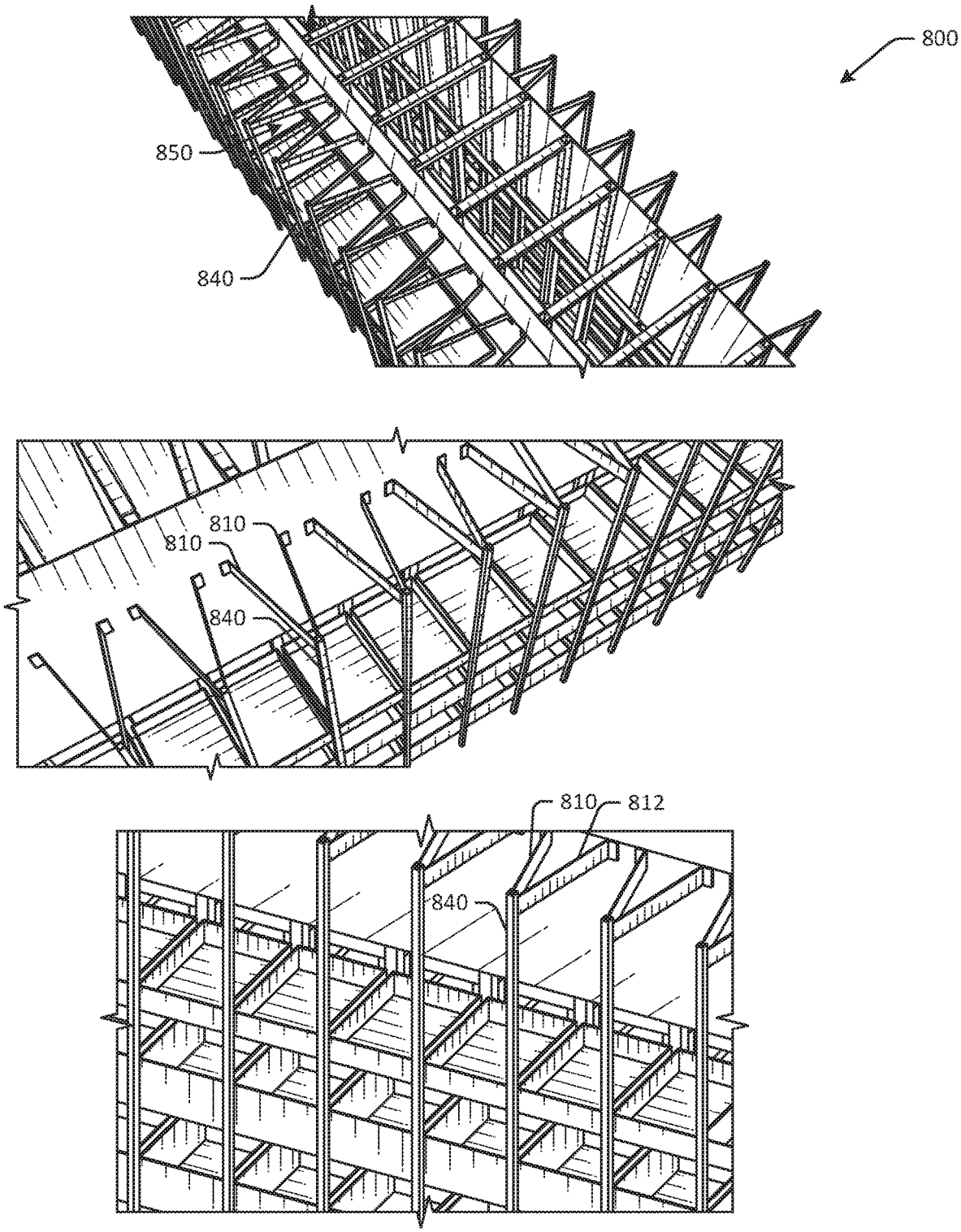

As illustrated in FIG. 6, as well as in FIGS. 7-8B, the chutes may be formed between supports that are disposed along one or more sides of the universal item sorter 600. The supports may include vertical support members, as well as additional support members that form a triangular support along an upper portion of the universal item sorter 600. For example, the universal item sorter 600 may include a first support coupled to the universal item sorter 600, and a second support coupled to the universal item sorter 600, where the first support and the second support together form the first chute 660 therebetween, and where the first support and the second support are configured to support a plurality of bins (e.g., the first bin 610, the second bin 620, etc.) disposed vertically in the first chute 660. The first bin 610 of the plurality of bins may be disposed in the first chute 660 at a first vertical position, and the second bin 620 of the plurality of bins may be disposed in the first chute at a second vertical position, where the first bin 610 and the second bin 620 are configured to receive items associated with multi-item orders. An order or arrangement of the bins may be rearranged in the first chute 660 and/or in a different chute or vertical position.

FIG. 7 is a schematic illustration of a top view and side view of an item sorting system 700 in accordance with one or more embodiments of the disclosure. Other embodiments may include additional or fewer components. The illustration of FIG. 7 may not be to scale, and may not be illustrated to scale with respect to other figures. The item sorting system illustrated in FIG. 7 may be the same universal item sorter discussed with respect to FIGS. 1-6.

In FIG. 7, as illustrated in top view, a universal item sorter may include a plurality of supports 710 disposed along one or more sides of the universal item sorter. The supports may form chutes between a pair of supports. For example, a first chute 720 may be on a first side of the universal item sorter, and a second chute 730 may be on a second side of the universal item sorter. The respective chutes may be formed between supports. As illustrated in the side view of FIG. 7, supports 740 may form a chute 750 therebetween.

Bins disposed in the chutes may have different dimensions. Bins may be grouped by dimension in some instances. For example, smaller bins may be near a left side of the machine closer to an inductor, while larger bins may be further away. In some instances, bins of various sizes may be interspersed. For example, a first bin 760 may have a first height, and a second bin 770 may have a second height that is different than, such as less than or greater than, the first height. In some instances, bins in the same chute may have different heights. In some embodiments, a gap may be disposed between a bottom of a first bin and a top of a second bin, such that items in the second bin can be removed without removing the first bin from a chute. In some instances, gaps may be about four inches, while in other instances, gaps may be about eight inches.

In some embodiments, the plurality of bins may include bins of different heights, and the plurality of bins may be disposed in an array configuration. For example, an array of bins may be formed in chutes along a side of the universal item sorter.

FIGS. 8A-8B are schematic illustrations of various views of an item sorting system with supports in accordance with one or more embodiments of the disclosure. Other embodiments may include additional or fewer components. The illustrations of FIGS. 8A-8B may not be to scale, and may not be illustrated to scale with respect to other figures. The item sorting system illustrated in FIGS. 8A-8B may be the same universal item sorter discussed with respect to FIGS. 1-7.

In FIG. 8A, a universal item sorter 800 is depicted in perspective view and in detail view. Shuttles used to transport items may move in one or more directions internally or externally with respect to the universal item sorter 800. For example, shuttles may move laterally along direction 820, and vertically along direction 830.

As illustrated in FIGS. 8A-8B, the universal item sorter 800 may include supports that support bins positioned in chutes between supports. Supports may include optionally angled members 810 coupled to the universal item sorter 800 (e.g., a frame or other component of the universal item sorter 800, etc.), and a vertical support member 840. For example, a first support may include two discrete members 810 that are angled with respect to a frame or other component of the universal item sorter 800. Specifically, the first support may include a first member 810 coupled to the universal item sorter 800 at a first distal end, and a second member 812 coupled to the universal item sorter 800 at a first distal end of the second member 812, and to the first member at a second distal end of the second member 812. The first member 810 and the second member 812 may extend from the universal item sorter 800 at an angle, such as equal and/or opposite angles. For example, the first member 810 and the second member 812 may form a triangular geometry 850. In other instances, the first member 810 and/or the second member 812 may form a ninety degree angle with respect to the universal item sorter 800 (e.g., a frame of the universal item sorter 800, etc.), or any other suitable angle. In some embodiments, the first member 810 and the second member 812 may be coupled to form an integrated member. Some embodiments may include a single member instead of the first member 810 and the second member 812.

The first support may include a vertical support member 840 that is perpendicular to the first member 810 and the second member 812, where the vertical support member 840 is coupled to a second distal end of the first member 810 and the second distal end of the second member 812. The first support and an adjacent support may together form a chute and may be configured to support a plurality of bins disposed vertically in the chute.

Additional chutes may be formed adjacent to the first chute with additional supports. For example, a second chute may be formed adjacent to the first chute. The second chute may be configured to support a greater number of bins or a lesser number of bins (or the same number of bins) than the first chute. Items positioned in the plurality of bins may have an individual weight of up to twenty pounds.

One or more operations of the methods, process flows, or use cases of FIGS. 1-8B may have been described above as being performed by a user device, or more specifically, by one or more program module(s), applications, or the like executing on a device. It should be appreciated, however, that any of the operations of the methods, process flows, or use cases of FIGS. 1-8B may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8B may be described in the context of the illustrative devices, it should be appreciated that such operations may be implemented in connection with numerous other device configurations.

The operations described and depicted in the illustrative methods, process flows, and use cases of FIGS. 1-8B may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-8B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 9:
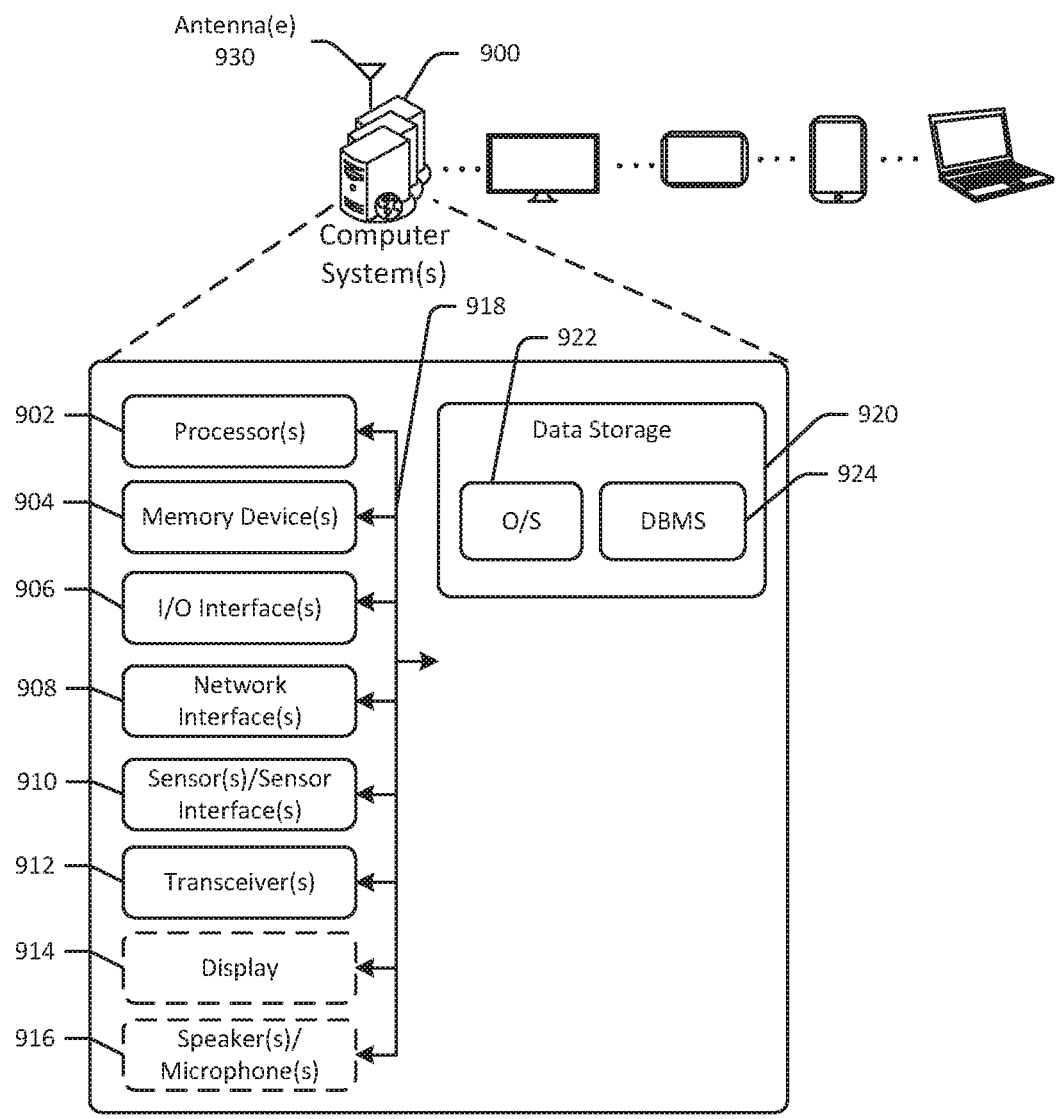
FIG. 9 schematically illustrates an example architecture of a computer system associated with an item sorting system in accordance with one or more embodiments of the disclosure.

FIG. 9 is a schematic block diagram of one or more illustrative computer system(s) 900 in accordance with one or more example embodiments of the disclosure. The computer system(s) 900 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 900 may correspond to an illustrative device configuration for the device(s) of FIGS. 1-8B.

The computer system(s) 900 may be configured to communicate with one or more servers, user devices, or the like. The computer system(s) 900 may be configured to sort items into one or more bins.

The computer system(s) 900 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 900 may include one or more processors (processor(s)) 902, one or more memory devices 904 (also referred to herein as memory 904), one or more input/output (I/O) interface(s) 906, one or more network interface(s) 908, one or more sensor(s) or sensor interface(s) 910, one or more transceiver(s) 912, one or more optional display(s) 914, one or more optional microphone(s) 916, and data storage 920. The computer system(s) 900 may further include one or more bus(es) 918 that functionally couple various components of the computer system(s) 900. The computer system(s) 900 may further include one or more antenna(e) 930 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, a memory bus, an address bus, or a message bus, and may permit the exchange of information (e.g., data (including computer-executable code), signaling, etc.) between various components of the computer system(s) 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 904 of the computer system(s) 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to the memory 904 for use by the processor(s) 902 during the execution of the computer-executable instructions. Moreover, output data generated as a result of execution of the computer-executable instructions by the processor(s) 902 may be stored initially in the memory 904, and may ultimately be copied to the data storage 920 for non-volatile storage.

More specifically, the data storage 920 may store one or more operating systems (O/S) 922; one or more database management systems (DBMS) 924; and one or more program module(s), applications, engines, computer-executable code, scripts, or the like. Some or all of these module(s) may be sub-module(s). Any of the components depicted as being stored in the data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in the data storage 920 may support functionality described in reference to corresponding components named earlier in this disclosure.

The data storage 920 may further store various types of data utilized by the components of the computer system(s) 900. Any data stored in the data storage 920 may be loaded into the memory 904 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 902 may be configured to access the memory 904 and execute the computer-executable instructions loaded therein. For example, the processor(s) 902 may be configured to execute the computer-executable instructions of the various program module(s), applications, engines, or the like of the computer system(s) 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to other illustrative components depicted as being stored in the data storage 920, the O/S 922 may be loaded from the data storage 920 into the memory 904 and may provide an interface between other application software executing on the computer system(s) 900 and the hardware resources of the computer system(s) 900. More specifically, the O/S 922 may include a set of computer-executable instructions for managing the hardware resources of the computer system(s) 900 and for providing common services to other application programs (e.g., managing memory allocation among various application programs). In certain example embodiments, the O/S 922 may control execution of the other program module(s). The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 900 is a mobile device, the DBMS 924 may be any suitable lightweight DBMS optimized for performance on a mobile device.

Referring now to other illustrative components of the computer system(s) 900, the input/output (I/O) interface(s) 906 may facilitate the receipt of input information by the computer system(s) 900 from one or more I/O devices as well as the output of information from the computer system(s) 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port or other connection protocol that may connect to one or more networks. The I/O interface(s) 906 may also include a connection to one or more of the antenna(e) 930 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 900 may further include one or more network interface(s) 908 via which the computer system(s) 900 may communicate with any of a variety of other systems, platforms, networks, devices, and so forth. The network interface(s) 908 may enable communication, for example, with one or more wireless routers, one or more host servers, one or more web servers, and the like via one or more networks.

The antenna(e) 930 may include any suitable type of antenna depending, for example, on the communications protocols used to transmit or receive signals via the antenna(e) 930. Non-limiting examples of suitable antennae may include directional antennae, non-directional antennae, dipole antennae, folded dipole antennae, patch antennae, multiple-input multiple-output (MIMO) antennae, or the like. The antenna(e) 930 may be communicatively coupled to one or more transceivers 912 or radio components to which or from which signals may be transmitted or received.

As previously described, the antenna(e) 930 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 930 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 930 may be configured to transmit or receive radio frequency signals within any suitable frequency range forming part of the unlicensed portion of the radio spectrum.

The antenna(e) 930 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(e) 930—transmitting or receiving radio frequency (RF) signals in the bandwidth and/or channels corresponding to the communications protocols utilized by the computer system(s) 900 to communicate with other devices. The transceiver(s) 912 may include hardware, software, and/or firmware for modulating, transmitting, or receiving—potentially in cooperation with any of antenna(e) 930—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the computer system(s) 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 914 may be configured to output light and/or render content. The optional speaker(s)/microphone(s) 916 may be any device configured to receive analog sound input or voice data.

It should be appreciated that the program module(s), applications, computer-executable instructions, code, or the like depicted in FIG. 9 as being stored in the data storage 920 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 900, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 9 may be implemented, at least partially, in hardware and/or firmware across any number of devices.

It should further be appreciated that the computer system(s) 900 may include alternate and/or additional hardware, software, or firmware components beyond those described or depicted without departing from the scope of the disclosure. More particularly, it should be appreciated that software, firmware, or hardware components depicted as forming part of the computer system(s) 900 are merely illustrative and that some components may not be present or additional components may be provided in various embodiments. While various illustrative program module(s) have been depicted and described as software module(s) stored in the data storage 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-8B may be performed by a device having the illustrative configuration depicted in FIG. 9, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-8B may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-8B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/ or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
   a plurality of modular sorting machines coupled in series, the plurality of modular sorting machines comprising a first modular sorting machine;
   a first support coupled to the first modular sorting machine;
   a second support coupled to the first modular sorting machine, wherein the first support and the second support together form a first chute therebetween, and wherein the first support and the second support are configured to support a plurality of bins disposed vertically in the first chute;
   a second chute adjacent to the first chute, wherein the second chute is configured to support a greater number of bins than the first chute;
   a first bin of the plurality of bins disposed in the first chute at a first vertical position; and
   a second bin of the plurality of bins disposed in the first chute at a second vertical position, wherein the first bin and the second bin are configured to receive items associated with multi-item orders;
   wherein an arrangement of the plurality of bins is configured to be rearranged in the first chute.

2. The system of claim 1, wherein the plurality of modular sorting machines is configured to singulate items from a tote comprising a plurality of items into the plurality of bins.

3. The system of claim 2, wherein the tote is associated with the plurality of modular sorting machines.

4. The system of claim 1, further comprising:
   a gap between a bottom of the first bin and a top of the second bin, such that items in the second bin can be removed without removing the first bin from the first chute.

5. The system of claim 1, wherein the first bin has a first height, and the second bin has a second height that is different than the first height.

6. The system of claim 1, wherein the first support comprises:
   a first member coupled to the first modular sorting machine at a first distal end;
   a second member coupled to the first modular sorting machine at a first distal end, and to the first member at a second distal end, wherein the first member and the second member extend from the first modular sorting machine at an angle with respect to a frame of the first modular sorting machine; and
   a vertical support member that is perpendicular to the first member and the second member, wherein the vertical support member is coupled to a second distal end of the first member and the second distal end of the second member.

7. The system of claim 1, further comprising:
   a third support; and
   a fourth support, wherein the third support and the fourth support together form a second chute therebetween, and wherein the third support and the fourth support are configured to support bins disposed in the second chute;
   wherein the plurality of bins is configured to be rearranged in both the first chute and the second chute.

8. The system of claim 1, wherein the plurality of bins comprises bins of different heights, and the plurality of bins are disposed in an array configuration.

9. The system of claim 1, wherein items positioned in the plurality of bins have an individual weight of up to twenty pounds.

10. An item sorting system comprising:
a first modular sorting machine;
a second modular sorting machine coupled to the first modular sorting machine;
a first support;
a second support, wherein the first support and the second support together form a first chute;
a first bin disposed in the first chute at a first vertical position; and
a second bin disposed in the first chute at a second vertical position, wherein the first bin and the second bin are configured to receive items associated with multi-item orders; and
an array of bins disposed in chutes along a side of the first modular sorting machine and the second modular sorting machine;
wherein the first bin and the second bin are configured to be rearranged in the first chute.

11. The system of claim 10, wherein the first support and the second support are configured to support a plurality of bins disposed vertically in the first chute.

12. The system of claim 10, wherein the first bin and the second bin have different dimensions.

13. The system of claim 10, wherein the first support comprises two discrete members that are angled with respect to a frame of the first modular sorting machine.

14. The system of claim 10, wherein the item sorting system is configured to singulate items from a tote comprising a plurality of items into the plurality of bins.

15. A system comprising:
a plurality of modular sorting machines coupled in series, the plurality of modular sorting machines comprising a first modular sorting machine;
a first support coupled to the first modular sorting machine;
a second support coupled to the first modular sorting machine, wherein the first support and the second support together form a first chute therebetween, and wherein the first support and the second support are configured to support a plurality of bins disposed vertically in the first chute;
a first bin of the plurality of bins disposed in the first chute at a first vertical position; and
a second bin of the plurality of bins disposed in the first chute at a second vertical position, wherein the first bin and the second bin are configured to receive items associated with multi-item orders;
wherein an arrangement of the plurality of bins is configured to be rearranged in the first chute, and wherein the plurality of modular sorting machines is configured to singulate items from a tote comprising a plurality of items into the plurality of bins.

16. The system of claim 15, further comprising:
a second chute adjacent to the first chute, wherein the second chute is configured to support a greater number of bins than the first chute.

17. The system of claim 15, wherein the tote is associated with the plurality of modular sorting machines.

18. The system of claim 15, further comprising:
a gap between a bottom of the first bin and a top of the second bin, such that items in the second bin can be removed without removing the first bin from the first chute.

19. The system of claim 15, wherein the first bin has a first height, and the second bin has a second height that is different than the first height.

20. The system of claim 15, wherein the plurality of bins comprises bins of different heights, and the plurality of bins are disposed in an array configuration.

* * * * *